H. J. METZ.
ATTACHMENT FOR CORN PLANTERS.
APPLICATION FILED APR. 26, 1918.
1,311,985.
Patented Aug. 5, 1919.
2 SHEETS—SHEET 1.
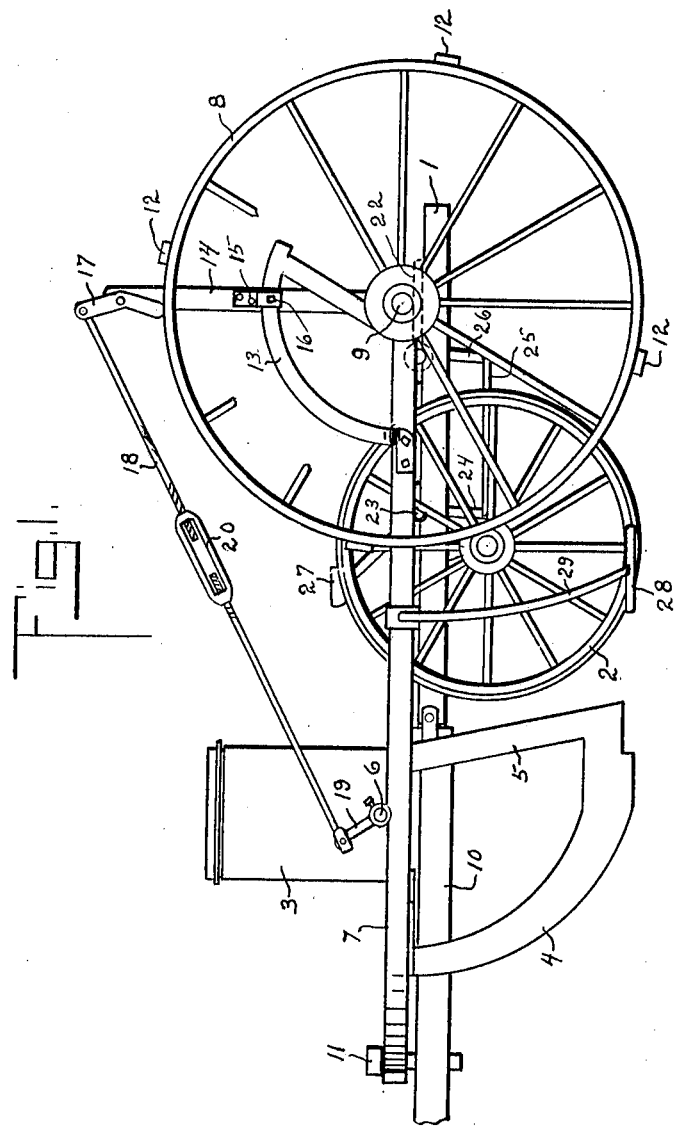
Witness
Inventor
Harry J. Metz,
By Walter N. Haskell,
his Attorney

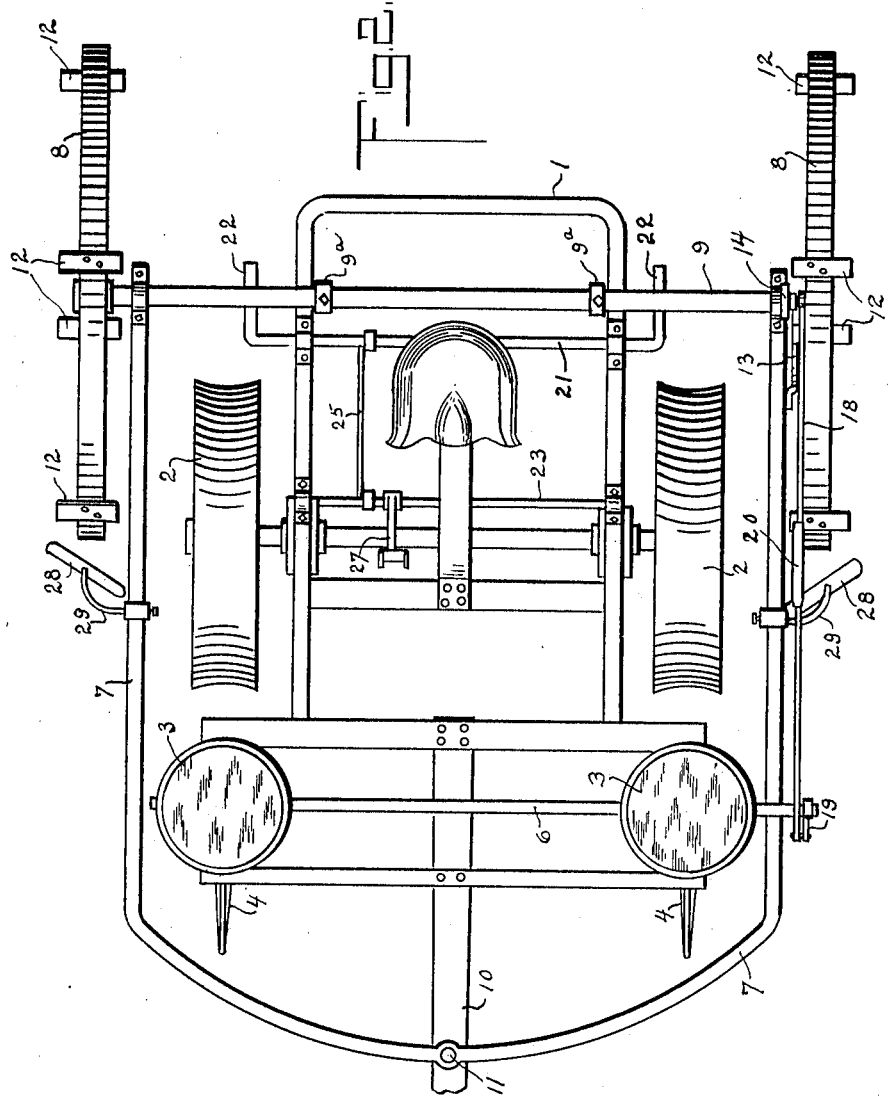

UNITED STATES PATENT OFFICE.

HARRY J. METZ, OF DAVENPORT, IOWA, ASSIGNOR OF ONE-HALF TO JOHN P. BLADEL, OF ROCK ISLAND, ILLINOIS.

ATTACHMENT FOR CORN-PLANTERS.

1,311,985. Specification of Letters Patent. Patented Aug. 5, 1919.

Application filed April 26, 1918. Serial No. 230,942.

*To all whom it may concern:*

Be it known that I, HARRY J. METZ, a citizen of the United States, residing at Davenport, in the county of Scott and State of Iowa, have invented certain new and useful Improvements in Attachments for Corn-Planters, of which the following is a specification.

My invention has reference to attachments for corn planters, and the chief purpose thereof is to equip the planter so that the seed-dropping devices can be operated without the use of a check-row wire. One of the principal objections to machines of this class has arisen from the fact that the machine will not drop the grain uniformly when moving in opposite directions. With a machine set for a spacing between the rows of a desired width, this space is frequently increased an inch or so by the force with which the seed is ejected from the delivery chute.

After the second hill has been planted the distances will be more or less uniform, while the machine is traveling in one direction, but on the return trip across a field the excess throw of the grain is in the opposite direction, so that if there is a two inch variation while the machine is traveling in one direction, on the return the hills will be four inches out of alinement with those first planted.

By the use of my device it is possible to correct this variation in the spacing, or other irregularities that may occur in the delivery of the seed.

My invention is also constructed so as to be readily applied to a corn-planter of ordinary build.

In the drawings: Figure 1 is a side elevation of a corn-planter equipped with my invention, with some of the parts cut away to more fully illustrate the device. Fig. 2 is a plan view thereof.

1 represents the frame of a corn-planter of a conventional design, supported on carrying wheels 2, and provided with hoppers 3 for the grain. Beneath the hoppers 3 are furrow-openers 4 and chutes 5 for the delivery of the grain to the earth. The hoppers are provided with the usual rock-shaft 6 for operation of the seed-dropping mechanism, which may be of any well-known construction, and is therefore not shown herein, and will not be further referred to, except in a general way.

7 is an auxiliary frame supported at its rear end by wheels 8, rotatably mounted on the ends of a shaft 9, the front end of said frame being connected with the tongue 10 of the planter by means of a bolt 11. At regular intervals on the peripheries of the wheels 8 are plates or clips 12, projecting outwardly at both sides of the wheels. These clips serve as markers, leaving their imprint in the soft earth, and enabling the operator to observe whether or not the rows of planted hills are in alinement, cross-wise of the field.

Supported from one side of the frame 7 is a segment 13, and an arm 14 is pivotally mounted on the shaft 9 so as to have movement on the inner face of said segment. Secured to the arm 14 is a keeper 15, capable of movement along the outer face of said segment, and provided with a set-screw 16 by means of which such keeper and the arm 14 can be held in adjusted position on said segment. Pivoted to the upper end of the arm 14 is a trip-lever 17, the upper end of which is connected by a rod 18 with the end of an arm 19, attached to the rock-shaft 6. The lower end of the lever 17 is in the path of the clips 12, so that in the rotation of the wheel 8 each of said clips will, in succession, rock the lever 17, causing a movement of the shaft 6, and discharging the desired amount of grain from the hoppers. The rod 18 is provided at a central point with a turn-buckle 20, by means of which such rod can be lengthened or shortened, to correspond with the adjustment of the arm 14 on the segment 13.

After the clip 12 has passed the lever 17, the rock-shaft 6 is returned to its normal position by devices such as are now in use for that purpose, and not specially involved herein. This movement returns the rod 18 and lever 17 to their former positions, ready for the next succeeding operation.

To prevent side movement of the rear part of the frame 7, the shaft 9 is provided with a pair of collars 9ª, capable of adjustment longitudinally thereof, and engaging the inner faces of the frame 1.

The effect of the adjustment of the arm 14 is to retard or hasten the movement of the seed-dropping devices, as may be desired. For instance, if the grain is being discharged with sufficient force to carry it a couple of inches beyond the desired spacing, it is the same, in effect, as if the movement occurred ahead of time to that extent. If this is the case, the arm 14 is moved toward the front of the machine sufficiently so that the clip 12 will have to travel approximately two inches farther in order to operate the lever 17. The plantings will thereafter be uniform, and the hills will be in alinement, regardless of which way the machine is traveling. In the same way, if for some reason the spacing between the hills is too short, the arm 14 is adjusted rearwardly until the fault is corrected.

With the arm 14 in a substantially vertical position the lever 17 will be tripped by one of the clips 12 at the top of the wheel, and the opposite clip will be leaving its mark in the earth. If the arm is moved forwardly a certain distance the lower trip will leave its mark and move a corresponding distance before the lever is tripped. The marks will still be in alinement, but the machine will advance the additional distance before the grain is dropped. If the lever is adjusted in the opposite direction, the space between the point of marking and the point of dropping will be correspondingly decreased.

In turning the machine at the end of the row, the operator can hold the shaft 9 and wheels 8 from the ground, or they can be raised by means of the following devices: A rock-shaft 21 is mounted transversely of the frame 1, and provided at its ends with arms 22, passing just beneath the axle 9. A shaft 23 is similarly mounted on the frame 1, and depending therefrom is an arm 24, connected by a rod 25 with a similar arm 26 fixed to the shaft 21. The shaft 23 is also provided with a foot-lever 27, convenient to the foot of the operator. Upon such lever being pushed downwardly the shafts 23 and 21 are simultaneously rocked, in a direction to cause the arms 22 to raise the shaft 9 a sufficient distance to permit the wheels 8 to clear the ground.

At each side of the frame 7 is supported an inclined blade 28, by means of an arm 29. These blades operate to smooth the ground in front of the wheels 8, so as to give a better opportunity for the imprint of the clips 12.

The wheels 8 may be of any suitable size, but a large wheel is preferable, on account of there being less danger of its being affected by the inequalities of the ground.

It is only necessary to have the clips 12 project on one side of the wheel 8, but a mark is formed which is more readily observed when they are used in the longer form.

It will be seen that my device can be readily attached to the frame of an ordinary planter, or detached therefrom. The preferred embodiment has been shown and described herein, but changes and adaptations can be made in the size and form thereof, and it can be applied to other uses than that mentioned, without departing from the scope and spirit thereof.

What I claim, and desire to secure, is:

1. In combination with the frame of a corn-planter, and seed-dropping devices thereof; an auxiliary frame, adapted for attachment to said main frame; a marking wheel on said auxiliary frame; an arm mounted on said auxiliary frame, and capable of adjustment thereon; trip mechanism carried by said arm, and adapted to be operated by said marking wheel; and means for imparting the movement of said trip mechanism to said dropping mechanism, to suitably actuate the same; said means being provided with devices for extension or contraction thereof, to conform with the adjustment of said arm.

2. In combination with the frame of a corn-planter, and seed-dropping devices thereof; an auxiliary frame, adapted to be attached to said first-named frame; a marking wheel on said auxiliary frame; a segment mounted on said auxiliary frame; an arm movable on said segment, and capable of being held in adjusted positions thereon; a trip-lever carried by said arm, and adapted to be operated by said marking wheel; and a rod, connecting said trip-lever with said dropping mechanism, and provided with means for extension or contraction thereof, to conform with the adjustment of said arm.

In testimony whereof I affix my signature.

HARRY J. METZ.

Copies of this patent may be obtained for five cents each, by addressing the "Commissioner of Patents, Washington, D. C."